(12) United States Patent
Son et al.

(10) Patent No.: US 10,494,476 B2
(45) Date of Patent: Dec. 3, 2019

(54) CONJUGATED POLYMER FOR ORGANIC SOLAR CELL AND ORGANIC SOLAR CELL INCLUDING THE SAME

(71) Applicant: KOREA INSTITUTE OF SCIENCE AND TECHNOLOGY, Seoul (KR)

(72) Inventors: Hae Jung Son, Seoul (KR); Phillip Lee, Seoul (KR); Jeung-hyun Jeong, Seoul (KR); Gyoungsik Kim, Seoul (KR); Sungmin Park, Seoul (KR); Injeong Shin, Seoul (KR); Sung-yoon Joe, Seoul (KR); Ji Yeong Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/161,522

(22) Filed: Oct. 16, 2018

(65) Prior Publication Data

US 2019/0144602 A1 May 16, 2019

(30) Foreign Application Priority Data

Nov. 15, 2017 (KR) .................. 10-2017-0152163

(51) Int. Cl.
*C08G 61/12* (2006.01)

(52) U.S. Cl.
CPC ..... *C08G 61/126* (2013.01); *C08G 2261/1412* (2013.01); *C08G 2261/3223* (2013.01); *C08G 2261/3246* (2013.01); *C08G 2261/91* (2013.01)

(58) Field of Classification Search
CPC ........ C08G 2261/12; C08G 2261/3246; C08G 2261/3245
USPC .................. 528/380, 264; 428/690; 564/426; 549/41, 456, 160, 349, 331
See application file for complete search history.

(56) References Cited

FOREIGN PATENT DOCUMENTS

KR    10-1540066 B1    7/2015

OTHER PUBLICATIONS

Hu et al. (J. Am. Chem. Soc. 2015, 137, 14149-14157).*

* cited by examiner

*Primary Examiner* — Shane Fang
(74) *Attorney, Agent, or Firm* — Rabin & Berdo, P.C.

(57) ABSTRACT

Disclosed is a conjugated polymer for an organic solar cell. The proportion of units containing no alkyl thiophene moieties in the conjugated polymer can vary to make the conjugated polymer suitable for use as an electron-donating organic semiconductor material in a small-area or large-area organic solar cell. Therefore, the use of the conjugated polymer ensures high energy conversion efficiency of the organic solar cell.

6 Claims, 3 Drawing Sheets

CONJUGATED POLYMER FOR ORGANIC SOLAR CELL AND ORGANIC SOLAR CELL INCLUDING THE SAME

CROSS-REFERENCE TO RELATED APPLICATIONS

This application claims priority under 35 U.S.C. § 119 to Korean Patent Application No. 10-2017-0152163 filed on Nov. 15, 2017 in the Korean Intellectual Property Office, the disclosure of which is incorporated herein by reference in its entirety.

BACKGROUND OF THE INVENTION

1. Field of the Invention

The present invention relates to a conjugated polymer for an organic solar cell, and more specifically to a conjugated polymer for an organic solar cell whose degree of aggregation in a solution is precisely controlled by the introduction of units containing no alkyl thiophene moieties, allowing the organic solar cell to have high efficiency and performance even when applied to a large-area process as well as a small-area process. The present invention also relates to an organic solar cell with improved energy conversion efficiency including the conjugated polymer.

2. Description of the Related Art

Solar cells are photovoltaic devices that convert solar energy into electrical energy. Solar cells have received attention as next-generation energy sources. Solar cells are broadly classified into inorganic and organic solar cells. Organic solar cells are divided into bi-layer p-n junction and bulk heterojunction types by the structure of photoactive layers. In a bi-layer p-n junction type solar cell, a p-type semiconductor layer and an n-type semiconductor layer are separated from each other. In a bulk heterojunction type solar cell, a p-type semiconductor is mixed with an n-type semiconductor to form one layer.

In 1986, C. Tang of Eastman Kodak Co. has first developed heterojunction solar cells using copper phthalocyanine (CuPc) and a perylenetetracarboxylic derivative and proposed their practical applicability. At the beginning of 1990, Heeger's group has reported solar cells in which a film formed using a mixture of a conjugated polymer and a fullerene derivative is used as a photoactive layer to generate electricity and has developed another fullerene derivative ($PC_{71}BM$), achieving an efficiency on the order of 7-8%. Thereafter, a great deal of research has been continuously conducted on highly efficient organic solar cells. Organic solar cells with greatly improved photoelectric conversion efficiency are currently being developed.

Such conjugated polymers (donor polymers) for photoactive layers are polymers containing only one kind of electron-sufficient aromatic group or push-pull alternating copolymers in which electron-deficient aromatic groups are introduced into electron-sufficient aromatic groups. Due to their low bandgaps, the polymers effectively absorb sunlight at a wide range of wavelengths and have excellent electrical properties such as high charge carrier mobilities.

To benefit from these advantages, numerous methods for designing conjugated polymers have been developed. Particularly, the introduction of fluorine (F) atoms into the backbone of conjugated polymers is considered. This fluorine introduction reduces the energy levels of photoactive polymers without sacrificing the bandgaps of the polymers and is thus effective in increasing open circuit voltage ($V_{OC}$). In addition, interaction between fluorine (F) and sulfur (S) or proton (H) of the adjacent aromatic groups can be induced, resulting in an increase in the planarity of the polymer backbone.

Effective π-π orbital bonds may be formed in the backbone of conjugated polymers prepared by the methods, causing an increase in the mobility of charge carriers in the vertical direction. Based on these advantages, conjugated polymers containing fluorine atoms introduced into the backbone have been applied to solar cells to improve the efficiency of the solar cells during recent years.

However, conjugated polymers containing fluorine (F) atoms have the disadvantages of low solubility and poor miscibility with fullerenes. Due to these disadvantages, when a fluorinated conjugated polymer and PCBM are applied to a photoactive layer, phase separation of the fluorinated conjugated polymer/PCBM bulk heterojunction takes place over hundreds of nanometers in the active layer, limiting the formation of charge carriers.

In an attempt to solve the above-described problems, a proposal has been made on conjugated polymers whose solubility is improved by introducing substituents into the side chains. The conjugated polymers can achieve high efficiency and charge mobility but need to be processed at high temperature because their solubility is still limited. Further, photoactive layers formed using the conjugated polymers by a large-area process have poor uniformity. The poor uniformity of the photoactive layers leads to a low efficiency (≤5%) of organic solar cells. Problems in reproducibility and film uniformity are obstacles to the commercialization of the organic solar cells.

Thus, there is a need to develop a conjugated polymer that effectively controls the occurrence of microphase separation and aggregation while maintaining its high efficiency and charge mobility, has high solubility, and can be used to form a uniform photoactive layer, facilitating the fabrication of an organic solar cell based on a high-temperature or large-area process.

PRIOR ART DOCUMENTS

Patent Documents

Korean Patent Publication No. 10-2010-0040783

SUMMARY OF THE INVENTION

The present invention has been made in an effort to solve the above problems, and it is an object of the present invention to provide a conjugated polymer for a high-performance organic solar cell in which the content of thiophene moieties having side chains is reduced and the repetition of units is limited for optimal orientation, achieving high solubility and enabling the formation of a uniform photoactive layer over a large area.

The present invention provides a conjugated polymer for an organic solar cell, represented by Formula I:

(I)

wherein $R_1$, $R_2$, $R_3$, and $R_4$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group and n is a real number from 0.1 to 0.3.

The present invention also provides a method for preparing the conjugated polymer represented by Formula I, including I) mixing a compound represented by Formula a:

(a)

wherein $R_1$ and $R_2$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group, the compound represented by Formula b:

(b)

a compound represented by Formula c:

(c)

wherein $R_7$ and $R_8$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group, and a solvent, and II) allowing the mixture to react in the presence of a catalyst.

The present invention also provides an organic solar cell including a photoactive layer employing the conjugated polymer.

The conjugated polymer of the present invention has a novel structure in which units containing no alkyl thiophene moieties are arranged randomly. Due to this structure, the conjugated polymer of the present invention maintains its inherent electrical and physical properties, solubility, and crystallinity comparable to those of conventional conjugated polymers and is optimally oriented, achieving high solubility and enabling the formation of a uniform photoactive layer over a large area.

The proportion of the units containing no alkyl thiophene moieties can vary to make the conjugated polymer of the present invention suitable for use as an electron-donating organic semiconductor material in a small-area or large-area organic solar cell. Therefore, the use of the conjugated polymer according to the present invention ensures high energy conversion efficiency of the organic solar cell.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Several aspects and various embodiments of the present invention will now be described in more detail.

One aspect of the present invention relates to a conjugated polymer for an organic solar cell, represented by Formula I:

(I)

wherein $R_1$, $R_2$, $R_3$, and $R_4$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group and n is a real number from 0.1 to 0.3.

More specifically, in Formula I, $R_1$ and $R_2$ are identical to or different from each other and are each independently a $C_{16}$-$C_{28}$ branched alkyl group, and $R_3$ and $R_4$ are identical to or different from each other and are each independently H or F. In this case, the energy conversion efficiency of a large-area organic solar cell including a photoactive layer formed using the conjugated polymer of Formula I by a high-temperature process is improved by 2-4% compared to that of an organic solar cell using FBT-Th$_4$ as a conventional conjugated polymer. The conjugated polymer of the present invention wherein $R_1$ and $R_2$ are different from each other may not have an optimum solubility for the fabrication of an organic solar cell and may lose its crystallinity. Thus, it is preferable that $R_1$ and $R_2$ in Formula I are identical to each other.

More preferably, $R_1$ and $R_2$ in Formula I are symmetric to each other, have the same structure, and are $C_{20}$-$C_{24}$ branched alkyl groups. In this case, the conjugated polymer has an optimum solubility while maintaining its crystallinity.

More preferably, both $R_3$ and $R_4$ in Formula I are H. If $R_3$ and $R_4$ in Formula I are substituted with fluorine (F), the conjugated polymer has low solubility, tends to aggregate, and has poor microstructural characteristics, which cause deterioration of its efficiency.

The use of the conjugated polymer is very effective in increasing the energy conversion efficiency of an organic solar cell by a maximum of at least 2-4%, which is of great significance in the art. Particularly, the energy conversion efficiency of an organic solar cell using the conjugated polymer of the present invention is improved by 2-4% compared to that of an organic solar cell using FBT-Th$_4$, as demonstrated in Experimental Example 1 that follows. FBT-Th$_4$ is known as an optimum conjugated polymer that lacks units containing no alkyl thiophene moieties.

This can also be sufficiently explained by the fact that an organic solar cell using the conjugated polymer of the present invention achieves an at least 1% increase in efficiency and increased open circuit voltage, short circuit current, and fill factor compared to an organic solar cell using the conjugated polymer FBT-Th$_4$ in which other units are introduced.

Preferably, n in Formula I is a real number from 0.1 to 0.3. If n exceeds 0.3, the energy conversion efficiency of a solar cell using the conjugated polymer is decreased by a factor of at least 1.5 to 2.

In conclusion, in Formula I, $R_1$ and $R_2$ are symmetric to each other, have the same structure, and are $C_{20}$-$C_{24}$ branched alkyl groups, both $R_3$ and $R_4$ are H, and n is 0.1, which are most preferred in terms of structural characteristics.

Due to this structure, the conjugated polymer of the present invention is free from the problems (low solubility, poor performance, and aggregation) of conventional conjugated polymers while maintaining its inherent advantages comparable to those of conventional conjugated polymers.

That is, the conjugated polymer of the present invention can provide a solution to the problems (low solubility, aggregation, poor performance caused by phase separation, and low efficiency when applied over a large area) of simple fluorinated conjugated polymers or conjugated polymers in which units having a new structure are introduced.

The conjugated polymer of the present invention has a novel structure in which units containing no alkyl thiophene moieties are arranged randomly. Due to this structure, the conjugated polymer of the present invention maintains its inherent electrical and physical properties and crystallinity comparable to those of conventional conjugated polymers and is optimally oriented, achieving high solubility and enabling the formation of a uniform photoactive layer over a large area. In addition, the efficiency of an organic solar cell using the conjugated polymer of the present invention is improved by 2 to 4% compared to that of an organic solar cell using a conventional conjugated polymer. This efficiency value is of great significance in the art.

The conjugated polymer of the present invention is selected from the group consisting of those represented by the following formulae Ia, Ib, and Ic:

Due to the presence of the units containing no alkyl thiophene moieties, the conjugated polymer of the present invention achieves high efficiency and charge mobility while maintaining its inherent improved electrical and physical properties comparable to those of conventional conjugated polymers. In addition, the conjugated polymer of the present invention effectively controls the occurrence of microphase separation and aggregation and has high solubility such that it does not suffer from deterioration of efficiency even when applied to a high-temperature or large-area process. Due to these advantages, the conjugated polymer of the present invention can be used to form a very uniform photoactive layer even when applied to a large-area process and can maintain its high efficiency even at a larger thickness of the photoactive layer.

Therefore, the conjugated polymer of the present invention can be utilized in a wide range of processes because it does not lose its activity even when applied to a large-area process.

According to a suitable embodiment of the present invention, the conjugated polymer is a donor material with an energy bandgap of 1.0 to 3.0 eV and can be blended with a C60 fullerene or C70 fullerene derivative to form a bulk heterojunction type photoactive layer in the fabrication of an organic solar cell.

The conjugated polymer of the present invention is used in combination with a non-fullerene electron acceptor to form a photoactive layer. Also in this case, the conjugated polymer of the present invention achieves an efficiency as high as at least 8%. This demonstrates that a conventional conjugated polymer can achieve a high efficiency only when combined with a specific electron acceptor whereas the novel conjugated polymer of the present invention is less affected by an electron acceptor. Therefore, the conjugated polymer of the present invention can be applied to a wider range of organic solar cells than conventional conjugated polymers.

A limited amount of a solvent (for example, 1,8-diiodooctane (DIO)) is used to control the morphology of a film composed of a blend of a conjugated polymer and a fullerene derivative. In the present invention, however, the amount of the solvent is not limited because the occurrence of severe phase separation is controlled by the conjugated polymer of the present invention.

When a photoactive layer formed using a mixture of the conjugated polymer according to the present invention and a fullerene derivative as an electron acceptor is applied to an organic solar cell, the conjugated polymer mixed with the fullerene derivative enables efficient dissociation of excited excitons into electrons and holes and reduces the size of fullerene domains formed by self-aggregation, resulting in a large increase in junction area. The increased junction area allows the photoactive layer to have a bulk heterojunction structure where more efficient charge separation occurs. Therefore, the use of the photoactive layer leads to a higher energy conversion efficiency of the organic solar cell.

A further aspect of the present invention relates to a method for preparing the conjugated polymer, including I) mixing a compound represented by Formula a:

wherein $R_1$ and $R_2$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group, the compound represented by Formula b:

a compound represented by Formula c:

wherein $R_7$ and $R_8$, which may be the same or different, are each independently hydrogen (H), fluorine (F), a substituted or unsubstituted $C_1$-$C_{30}$ alkyl group or a substituted or unsubstituted $C_3$-$C_{30}$ cycloalkyl group, and a solvent, and II) allowing the mixture to react in the presence of a catalyst.

Specifically, in step I), the compounds of Formulae a, b, and c are mixed with a solvent.

Preferably, the compounds of Formulae a, b, and c are used in amounts such that the ratio of the moles of the compound of Formula c to the total moles of the compound of Formulae a and b is 1:1. The compound of Formula a and the compound of Formula b are mixed in a molar ratio of 0.9-0.5:0.1-0.5 but are not particularly limited to this ratio.

If the moles of the compound of Formula c are less or greater than the total moles of the compound of Formulae a and b, sufficient polymerization of the compounds cannot be expected.

The solvent can be selected from benzene, toluene, chlorobenzene, o-dichlorobenzene, dimethylformamide (DMF), and mixtures thereof. The conjugated polymer represented by Formula I may be precipitated with acetone, THF, methanol, ethanol or ethyl acetate during preparation due to its low solubility in the solvent. This simple purification procedure for high yield of the conjugated polymer shortens the preparation time.

In subsequent step II), the mixture is allowed to react in the presence of a palladium catalyst.

The palladium catalyst can be selected from the group consisting of $PdCl_2$, $Pd(OAc)_2$, $Pd(CH_3CN)_2Cl_2$, $Pd(PhCN)_2Cl_2$, $Pd_2(dba)_3$, $Pd_2(dba)_3CHCl_3$, $Pd(PPh_3)_4$, and mixtures thereof.

In step II), the reaction is carried out at a temperature of 100 to 200° C. If the reaction temperature is lower than 100° C., the reaction may be retarded and large amounts of the reactants may remain unreacted. Meanwhile, if the reaction temperature is higher than 200° C., the solvent may be vaporized, making it difficult for the reaction to proceed. Thus, it is most preferable that the mixture is heated to the temperature range defined above.

In addition, the method may further include III) adding the reaction mixture to a precipitant to precipitate the conjugated polymer and filtering the resulting mixture to obtain the conjugated polymer in high yield.

The precipitant has a low solubility for the conjugated polymer. The precipitant is not particularly limited and any solvent capable of precipitating the conjugated polymer from the reaction mixture may be used as the precipitant. Preferably, the precipitant is selected from acetone, THF, methanol, ethanol, ethyl acetate, and mixtures thereof.

The precipitated conjugated polymer can be separated by filtration.

The conjugated polymer represented by Formula I is prepared in a yield of at least 90%, preferably 90 to 99%.

The conjugated polymer represented by Formula I may have an average molecular weight of 20 to 100 kDa.

Another aspect of the present invention relates to an organic solar cell including a photoactive layer employing the conjugated polymer.

The organic solar cell achieves various effects, such as high photoelectric conversion efficiency and good life stability.

More specifically, the organic solar cell includes a substrate, a first electrode, a buffer layer, a photoactive layer, and a second electrode.

The photoactive layer is formed using a photoelectric conversion material. The photoelectric conversion material is a blend of a fullerene or non-fullerene electron acceptor and a conjugated polymer represented by Formula I:

(I)

wherein $R_1$, $R_2$, $R_3$, and $R_4$, which may be the same or different, are each independently hydrogen (H), fluorine (F), a substituted or unsubstituted $C_1$-$C_{30}$ straight or branched alkyl group or a substituted or unsubstituted $C_3$-$C_{30}$ cycloalkyl group and n is a real number from 0.1 to 0.3.

The conjugated polymer acts as an electron donor. The conjugated polymer represented by Formula I is the same as that described above and a description thereof is thus omitted to avoid duplication.

Indium-tin oxide (ITO), fluorine doped tin oxide (FTO), ZnO—($Ga_2O_3$ or $Al_2O_3$) or $SnO_2$—$Sb_2O_3$ may be used as a material for the first electrode. ITO is more preferably used as a material for the first electrode.

The buffer layer is formed on the first electrode. The buffer layer is formed using polyethylenimine ethoxylated (PEIE) or ZnO to improve the electron mobility. The buffer layer may be formed by any suitable coating process such as spin coating.

The photoactive layer is formed on the buffer layer. The photoactive layer has a junction structure consisting of the conjugated polymer as an electron donor and a fullerene or non-fullerene derivative as an electron acceptor. The photoactive layer can provide a photovoltaic effect based on very fast charge transfer and separation between the electron donor and the electron acceptor.

The conjugated polymer of the present invention can exhibit markedly improved performance due to its high miscibility with the electron acceptor despite the presence of a small amount of the electron acceptor in the photoactive layer compared to that in a photoactive layer formed using a conventional conjugated polymer. The conjugated polymer of the present invention is preferably blended with the electron acceptor in a weight ratio of 1:1.5 to 1:2.

The photoactive layer formed using the conjugated polymer of the present invention by a small-area or large-area process has better performance than a photoactive layer formed using a conventional conjugated polymer due to the functions and effects (such as controlled aggregation) of the conjugated polymer according to the present invention mentioned above or demonstrated in the following experimental example. Although the conjugated polymer is subjected to a high-temperature process, high efficiency of the photoactive layer is ensured. Examples of such high-temperature processes include, but are not particularly limited to, printing, spin coating, screen printing, doctor blade coating, and deposition through a shadow mask.

The second electrode may be formed using a material selected from the group consisting of gold, aluminum, copper, silver, molybdenum oxide ($MoO_3$), and combinations thereof. The material for the second electrode is preferably silver or silver/molybdenum oxide ($MoO_3$).

The present invention also provides a tandem organic solar cell including two or more unit cells vertically connected to each other wherein the photoelectronic device constitutes each of the unit cells.

The present invention will be explained in more detail with reference to the following examples. However, these examples are intended for illustrative purposes only and the invention is not limited thereto. Therefore, it will be evident to those skilled in the art that various modifications and variations can be made without departing from the scope and spirit of the invention.

Synthesis Example 1: Preparation of FBT-Th$_4$
(Formula a)

[Reaction Scheme 1]

-continued

FBT-Th4(1,4)

1) Synthesis of 1,2-diamino-3,6-dibromo-4,5-difluorobenzene (Formula 1)

1,4-Dibromo-2,3-difluoro-5,6-dinitrobenzene (3.3 g, 9.2 mmol), an iron powder (7.3 g, 130 mmol) and acetic acid (130 mL) were stirred in a 250 mL two-neck round bottom flask under an argon atmosphere at 45° C. for 6 h. The reaction solution was cooled to room temperature, poured into a cold NaOH solution (5%, 400 mL), and extracted three times with ethyl acetate. The organic fractions (ethyl acetate phase) were collected, washed with a $NaHCO_3$ solution, and dried over anhydrous $MgSO_4$. The solvent was removed under vacuum to afford 2.72 g (yield 98%) of the title compound as a bright yellow powder.

$^1$H NMR (300 MHz, DMSO) δ (ppm): 5.16 (s, 4H).
$^{13}$C NMR (75 MHz, DMSO) δ (ppm): 141.08, 140.83, 137.97, 137.73, 130.06, 94.66, 94.50, 94.36.

2) Synthesis of 4,7-dibromo-5,6-difluoro[2,1,3]benzothiadiazole (Formula 2)

Thionyl chloride (1.76 mL, 9.02 mmol) was added to a solution of 1,2-diamino-3,6-dibromo-4,5-difluorobenzene (Formula 1) (2.72 g, 9.02 mmol) in a mixture of triethylamine (4.27 mL, 30.64 mmol) and dry chloroform (136 mL). After heating to 70° C., the resulting mixture were stirred overnight. The reaction mixture was cooled to room temperature, poured into 100 mL of ice-water, and extracted three times with dichloromethane. The organic fractions were collected, dried over anhydrous $MgSO_4$, and filtered. Volatiles were removed under vacuum and the residue was purified by silica gel column chromatography using petroleum ether/dichloromethane (4:1) as the eluent, affording 2.74 g (yield 92%) of the title compound as a bright yellow solid.

$^{13}$C NMR (75 MHz, DMSO) δ (ppm): 153.67, 153.39, 150.20, 149.92, 148.84, 99.51, 99.39, 99.33, 99.20.

(3) Synthesis of 4,7-bis(4-(2-decyltetradecyl)thiophen-2-yl)-5,6-difluoro[2,1,3]benzothiadiazole (Formula 3)

4,7-Dibromo-5,6-difluoro[2,1,3]benzothiadiazole (Formula 2) (330 mg, 1 mmol), tributyl(4-(2-decyltetradecyl)-2-thienyl)stannane) (2.13 g, 3 mmol), and dichlorobis(triphenylphosphine)palladium (0.028 g, 0.040 mmol) were placed in a 50 mL three-neck flask. The flask was purged with nitrogen for 30 min. Subsequently, anhydrous toluene (15 mL) was added to the flask and the mixture was heated to reflux for 24 h. Then, the solvent was removed from the reaction solution and the residue was purified by silica gel column chromatography using petroleum as the eluent, affording 0.808 g (yield 80%) of the title compound as a yellow solid.

$^1$H NMR (300 MHz, CDCl$_3$) δ (ppm): 8.09 (s, 2H), 7.17 (s, 2H), 2.72 (d, J=6.9 Hz, 4H), 1.69 (s, 2H), 1.37-1.20 (m, 80H), 0.87 (t, J=12.9 Hz, 12H).

$^{13}$C NMR (75 MHz, CDCl$_3$) δ (ppm): 151.61, 151.34, 148.99, 148.94, 148.88, 148.17, 147.90, 142.35, 132.86, 132.81, 131.01, 124.83, 111.78, 111.66, 111.60, 38.97, 34.89, 33.37, 31.94, 30.04, 29.71, 29.68, 29.37, 26.66, 22.70, 14.11.

(4) Synthesis of 4,7-bis(5-bromo-4-(2-decyltetradecyl)thiophen-2-yl)-5,6-difluoro[2, 1,3]benzothiadiazole (Formula 4)

N-Bromosuccinimide (313 mg, 1.76 mmol) was added to a solution of 4,7-bis(4-(2-decyltetradecyl)thiophen-2-yl)-5,6-difluoro[2,1,3]benzothiadiazole (Formula 3) (808 mg, 0.8 mmol) in 15 mL of THF. The reaction was allowed to proceed at room temperature. After stirring for 24 h, the reaction mixture was added with 50 mL of water and extracted three times with dichloromethane. The organic fractions were combined, washed with brine, and dried over anhydrous $MgSO_4$. Volatiles were removed and the residue was recrystallized from ethanol, affording 0.746 g (yield 80%) of the title compound as an orange solid.

$^1$H NMR (300 MHz, CDCl$_3$) δ (ppm): 7.89 (s, 2H), 2.56 (d, J=7.0 Hz, 4H), 1.73 (s, 2H), 1.35-1.20 (m, 80H), 0.87 (t, J=12 Hz, 12H).

$^{13}$C NMR (75 MHz, CDCl$_3$) δ (ppm): 151.50, 151.23, 148.45, 148.39, 148.04, 147.77, 141.76, 132.41, 132.34, 132.29, 131.03, 115.17, 115.12, 115.07, 111.06, 111.00, 110.95, 110.89, 38.54, 34.15, 33.41, 31.94, 30.02, 29.72, 29.68, 29.37, 26.57, 22.69, 14.10.

5) Synthesis of FBT-Th$_4$(1,4) (Formula 5)

The compound of Formula 4 synthesized in 4) and 5,5'-bis(trimethylstannyl)-2,2'-bithiophene were subjected to Stille coupling reaction to prepare FBT-Th$_4$(1,4) as a black solid in a yield of 87% (see Reaction Scheme 1).

FBT-Th$_4$(1,4) (Formula 5) was soluble in warm chloroform and chlorobenzene (CB) and 1,2-dichlorobenzene (DCB) at room temperature. The molecular weight of the polymer was determined by gel permeation chromatography (GPC) using 1,2,4-trichlorobenzene as the eluent at 140° C. As a result, FBT-Th$_4$(1,4) was found to have a M$_n$ of 46.4 kg/mol and a M$_w$/M$_n$ of 1.7. The chain of FBT-Th$_4$(1,4) consists of about 40 repeating units.

TGA analysis revealed that FBT-Th$_4$(1,4) (Formula 5) was not decomposed at 400° C. but underwent a weight loss (Td) of ~5%. As a result of DSC analysis, a peak (ΔH=25.81 J/g) corresponding to an endothermic transition for melting was observed at 255° C. during heating and a peak (ΔH=25.81 J/g) corresponding to an exothermic transition for aggregation was observed at 220° C. during cooling.

Synthesis Example 2: Synthesis of PDT2fBT-BT10 (Formula 1a)

(1) Synthesis of (4-(2-decyltetradecyl)thiophen-2-yl)trimethylstannane (Formula 6)

[Reaction Scheme 2]

(6)

Diisopropylamine (0.60 mL, 4.28 mmol) was dissolved in anhydrous tetrahydrofuran (THF, 2 mL). The solution was cooled to −78° C. After slow addition of n-butyl lithium (n-BuLi, 1.6 M in hexane, 2.45 mL, 3.92 mmol), the temperature was raised to 0° C. The resulting solution was allowed to react for 30 min to prepare lithium diisopropylamine (LDA). 3-(2-Decyltetradecyl)thiophene (1.5 g, 3.56 mmol) was dissolved in tetrahydrofuran (THF, 21 mL) in another flask. The solution was cooled to −78° C. To the flask was slowly added the lithium diisopropylamine (LDA). Thereafter, the reaction was carried out at the same temperature for 1 h. After the addition of a trimethyltin chloride solution (1 M in THF, 4.27 mL, 4.27 mmol), the temperature was allowed to rise to room temperature for sufficient reaction. The reaction was quenched with distilled water. The reaction mixture was extracted with ethyl ether and the solvent was removed from the organic layer using a rotary evaporator. Drying under vacuum gave the title product (1.97 g, 94.7%). The product was used for the next reaction without further purification.

$^1$H NMR (CDCl$_3$) δ (ppm): 7.15 (d, 1H), 6.95 (d, 1H), 2.57 (d, 2H), 1.54-1.62 (m, 1H), 1.25-1.33 (m, 40H), 0.86-0.90 (m, 6H), 0.27-0.42 (m, 9H).

(2) Synthesis of 4,7-bis(4-(2-decyltetradecyl)thiophen-2-yl)-5,6-difluorobenzo[c][1,2,5]thiadiazole (Formula 8)

[Reaction Scheme 3]

The compound (1.92 g, 3.29 mmol) of Formula 6 synthesized in (1) of Synthesis Example 2, 4,7-dibromo-5,6-difluorobenzo[c][1,2,5]thiadiazole (Formula 7) (434.5 mg, 1.32 mmol), and bis(triphenylphosphine)palladium(II) dichloride (Pd(PPh$_3$)$_2$Cl$_2$) were dissolved in anhydrous tetrahydrofuran (THF, 8.7 mL) under a nitrogen atmosphere. The solution was refluxed for 2 days. The reaction solution was cooled to room temperature to quench the reaction. The solvent was removed using a rotary evaporate. The residue was purified by column chromatography using hexane and precipitated in methanol, affording 4,7-bis(4-(2-decyltetradecyl)thiophen-2-yl)-5,6-difluorobenzo[c][1,2,5]thiadiazole (950 mg, 71.4%) represented by Formula 8.

$^1$H NMR (CDCl$_3$) δ (ppm): 8.09 (s, 2H), 7.18 (s, 2H), 2.65 (d, 4H), 1.67-1.75 (m, 1H), 1.24-1.31 (m, 80H), 0.85-0.88 (m, 12H).

(3) Synthesis of 4,7-bis(5-bromo-4-(2-decyltetradecyl)thiophen-2-yl)-5,6-difluorobenzo[c][1,2,5]thiadiazole (Formula 9)

[Reaction Scheme 4]

The compound (740.4 mg, 0.73 mmol) of Formula 8 synthesized in (2) of Synthesis Example 2 was added to and dissolved in a mixture of chloroform and acetic acid (1:1 (v/v), 15 mL). To the solution was slowly added N-bromosuccinimide (NBS) (313.2 mg, 1.76 mmol). The temperature was raised to 50° C. for sufficient reaction. After completion of the reaction, the reaction solution was added with an aqueous solution of sodium bicarbonate (NaHCO$_3$) and extracted with chloroform. The solvent was removed using a rotary evaporate. The residue was purified by column chromatography using hexane and precipitated in cold methanol, affording 4,7-bis(5-bromo-4-(2-decyltetradecyl)thiophen-2-yl)-5,6-difluorobenzo[c][1,2,5]thiadiazole (801 mg, 93.5%) represented by Formula 9.

$^1$H NMR (CDCl$_3$) δ (ppm): 7.94 (s, 2H), 2.59 (d, 4H), 1.72-1.78 (m, 2H), 1.20-1.35 (m, 80H), 0.85-0.89 (m, 12H).

(4) Synthesis of PDT2fBT-BT10 (Formula 1a)

4,7-Bis(5-bromo-4-(2-decyltetradecyl)thiophen-2-yl)-5,6-difluorobenzo[c][1,2,5]thiadiazole (312.1 mg, 0.267 mmol) synthesized in (3) of Synthesis Example 2, 4,7-dibromo-5,6-difluorobenzo[c][1,2,5]thiadiazole (Formula 7) (9.8 mg, 0.0297 mmol) used in (2) of Synthesis Example 2, and 5,5'-bis(trimethylstannyl)-2,2'-bithiophene (146.1 mg, 0.297 mmol) were mixed together, and tris(dibenzylideneacetone)dipalladium(0) (Pd$_2$(dba)$_3$, 5.4 mg, 0.006 mmol) and tri(ortho-tolyl)phosphine (P(o-tolyl)$_3$, 14.3 mg, 0.047 mmol) were added thereto. The resulting mixture was dissolved in degassed chlorobenzene (3 mL) in a microwave reactor.

The solution was stirred under microwave irradiation at 160° C. for 2 h. The reaction solution was cooled to room temperature, precipitated in acetone, and filtered. The filtrate was sequentially washed by Soxhlet extraction with methanol, ethyl acetate, hexane, and dichloromethane and extracted with chloroform. Chloroform was removed from the extract using a rotary evaporator. The residue was precipitated in methanol and filtered, affording the conjugated polymer PDT2fBT-BT10 (307.2 mg, 95%) represented by Formula 1a.

Mn=55.5 kDa, PDI=2.0

$^1$H NMR (C$_2$D$_2$Cl$_4$, 333K) δ (ppm): 8.02-8.30 (br, 1.8H), 6.98-7.40 (br, 4H), 2.62-2.94 (br, 3.6H), 1.85 (br, 1.8H), 1.10-1.59 (br, 72H), 0.87-0.89 (br, 10.8H).

Synthesis Example 3: Synthesis of PDT2fBT-BT20 (Formula 1b)

The compound (93.4 mg, 0.08 mmol) of Formula 9 synthesized in (3) of Synthesis Example 2, 4,7-dibromo-5,6-difluorobenzo[c][1,2,5]thiadiazole (Formula 7) (6.6 mg, 0.02 mmol) used in (2) of Synthesis Example 2, and 5,5'-bis(trimethylstannyl)-2,2'-bithiophene (49.2 mg, 0.1 mmol) were mixed together, and tris(dibenzylideneacetone)dipalladium(0) (Pd$_2$(dba)$_3$, 1.8 mg, 0.002 mmol) and tri(orthotolyl)phosphine (P(o-tolyl)$_3$, 4.9 mg, 0.016 mmol) were added thereto. The resulting mixture was dissolved in degassed chlorobenzene (1 mL) in a microwave reactor.

The solution was stirred under microwave irradiation at 160° C. for 2 h. The reaction solution was cooled to room temperature, precipitated in acetone, and filtered. The filtrate was sequentially washed by Soxhlet extraction with methanol, ethyl acetate, hexane, and dichloromethane and extracted with chloroform. Chloroform was removed from the extract using a rotary evaporator. The residue was precipitated in methanol and filtered, affording the conjugated polymer PDT2fBT-BT20 (94 mg, 93.6%) represented by Formula 1b.

Mn=46.7 kDa, PDI=3.22

$^1$H NMR (C$_2$D$_2$Cl$_4$, 333K) δ (ppm): 8.14-8.22 (br, 1.6H), 7.22-7.30 (br, 4H), 2.86-2.94 (br, 3.2H), 1.88 (br, 1.6H), 1.12-1.48 (br, 64H), 0.89-0.92 (br, 9.6H).

Synthesis Example 4: Synthesis of PDT2fBT-BT30 (Formula 1c)

The compound (85.0 mg, 0.0728 mmol) of Formula 9 synthesized in (3) of Synthesis Example 2, 4,7-dibromo-5,6-difluorobenzo[c][1,2,5]thiadiazole (Formula 7) 10.3 mg, 0.0312 mmol) used in (2) of Synthesis Example 2, and 5,5'-bis(trimethylstannyl)-2,2'-bithiophene (51.2 mg, 0.104 mmol) were mixed together, and tris(dibenzylideneacetone) dipalladium(0) (Pd$_2$(dba)$_3$, 1.9 mg, 0.002 mmol) and tri (ortho-tolyl)phosphine (P(o-tolyl)$_3$, 5.1 mg, 0.017 mmol) were added thereto. The resulting mixture was dissolved in degassed chlorobenzene (1 mL) in a microwave reactor.

The solution was stirred under microwave irradiation at 160° C. for 2 h. The reaction solution was cooled to room temperature, precipitated in acetone, and filtered. The filtrate was sequentially washed by Soxhlet extraction with methanol, ethyl acetate, hexane, and dichloromethane and extracted with chloroform. Chloroform was removed from the extract using a rotary evaporator. The residue was precipitated in methanol and filtered, affording the conjugated polymer PDT2fBT-BT30 (94 mg, 93.6%) represented by Formula 1c.

Mn=57.6 kDa, PDI=2.07

$^1$H NMR (C$_2$D$_2$Cl$_4$, 333K) δ (ppm): 8.17 (br, 1.4H), 7.25-7.38 (br, 4H), 2.82-2.93 (br, 2.8H), 1.87 (br, 1.4H), 0.99-1.41 (br, 56H), 0.87-0.92 (br, 8.4H).

Example 1: Formation of PDT2fBT-BT10 Thin Film

A glass substrate was sequentially washed with isopropyl alcohol for 10 min, acetone for 10 min, and isopropyl alcohol for 10 min in an ultrasonic cleaner and dried before use. A polyethylenimine ethoxylated (PEIE) solution was spin coated on the dry glass substrate and dried at 100° C. for 10 min.

Then, the conjugated polymer PDT2fBT-BT10 (Formula Ia) (10 mg) synthesized in Synthesis Example 2 was dissolved in 1 mL of chlorobenzene.

The solution was spin coated on the PEIE-coated glass substrate at 800 rpm and 80° C. and heated at 90° C. for 5 min to form a PDT2fBT-BT10 thin film.

Example 2: Formation of PDT2fBT-BT20 Thin Film

A PDT2fBT-BT20 thin film was formed in the same manner as in Example 1, except that the conjugated polymer PDT2fBT-BT20 (Formula Ib) (10 mg) synthesized in Synthesis Example 3 was used instead of the conjugated polymer PDT2fBT-BT10 (Formula Ia) (10 mg) synthesized in Synthesis Example 2.

Example 3: Formation of PDT2fBT-BT30 Thin Film

A PDT2fBT-BT30 thin film was formed in the same manner as in Example 1, except that the conjugated polymer PDT2fBT-BT30 (Formula Ic) (10 mg) synthesized in Synthesis Example 4 was used instead of the conjugated polymer PDT2fBT-BT10 (Formula Ia) (10 mg) synthesized in Synthesis Example 2, a mixed solvent of chlorobenzene and 1,2-dichlorobenzene (1:1 (v/v)) was used instead of chlorobenzene, and the mixture solution was spin coated at 110° C. instead of at 70° C.

Example 4: Formation of PDT2fBT-BT10:$PC_{71}BM$ Thin Film

An indium-tin-oxide (ITO) substrate was sequentially washed with isopropyl alcohol for 10 min, acetone for 10 min, and isopropyl alcohol for 10 min in an ultrasonic cleaner and dried before use. A polyethylenimine ethoxylated (PEIE) solution was spin coated on the dry ITO substrate and dried at 100° C. for 10 min.

Then, chlorobenzene and chloronaphthalene were mixed in a 1:0.025 volume ratio to prepare a first solution. The conjugated polymer PDT2fBT-BT10 (Formula Ia) (10 mg) synthesized in Synthesis Example 2 and $PC_{71}BM$ (20 mg) were added to 1 mL of the first solution to prepare a mixture solution. The conjugated polymer and $PC_{71}BM$ were used in a weight ratio of 1:2.

The mixture solution was spin coated on the PEIE-coated ITO substrate at 800 rpm and 70° C. and heated at 90° C. for 5 min to form a PDT2fBT-BT10:$PC_{71}BM$ thin film.

Example 5: Formation of PDT2fBT-BT20:$PC_{71}BM$ Thin Film

A PDT2fBT-BT20:$PC_{71}BM$ thin film was formed in the same manner as in Example 4, except that the conjugated polymer PDT2fBT-BT20 (Formula Ib) (10 mg) synthesized in Synthesis Example 3 was used instead of the conjugated polymer PDT2fBT-BT10 (Formula Ia) (10 mg) synthesized in Synthesis Example 2 and the amount of $PC_{71}BM$ was changed from 20 mg to 15 mg (1:1.5 weight ratio).

Example 6: Formation of PDT2fBT-BT30:$PC_{71}BM$ Thin Film

A PDT2fBT-BT30:$PC_{71}BM$ thin film was formed in the same manner as in Example 4, except that a solution of chlorobenzene, 1,2-dichlorobenzene, and diphenyl ether in a 1:1:0.03 volume ratio was used instead of the first solution, the conjugated polymer PDT2fBT-BT30 (Formula Ic) (10 mg) synthesized in Synthesis Example 4 was used instead of the conjugated polymer PDT2fBT-BT10 (Formula Ia) (10 mg) synthesized in Synthesis Example 2, the amount of $PC_{71}BM$ was changed from 20 mg to 15 mg (1:1.5 weight ratio), and the mixture solution was spin coated at 110° C. instead of at 70° C.

Example 7: Formation of PDT2fBT-BT10:o-IDTBR Thin Film

A PDT2fBT-BT10:o-IDTBR thin film was formed in the same manner as in Example 4, except that a solution of chlorobenzene and 1,2-dichlorobenzene in a 1:1 volume ratio was used instead of the first solution, o-IDTBR (10 mg) was used instead of $PC_{71}BM$ (20 mg), and the spin coating was performed at 1500 rpm instead of at 800 rpm.

Example 8: Formation of PDT2fBT-BT10:ITIC Thin Film

A PDT2fBT-BT10:ITIC thin film was formed in the same manner as in Example 4, except that a solution of chlorobenzene, 1,2-dichlorobenzene, and 1,8-diiodooctane in a 1:1:0.005 volume ratio was used instead of the first solution, the amount of PDT2fBT-BT10 synthesized in Synthesis Example 2 was changed from 10 mg to 8 mg, 20 mg of ITIC was used instead of 8 mg of $PC_{71}BM$, and the spin coating was performed at 2000 rpm instead of at 800 rpm.

Example 9: Fabrication of Organic Solar Cell Including the PDT2fBT-BT10:$PC_{71}BM$ Thin Film A molybdenum oxide ($MoO_3$) layer was deposited to a thickness of 4 nm on the PDT2fBT-BT10:$PC_{71}BM$ thin film formed in Example 4 and a silver electrode was deposited to a thickness of 100 nm on the $MoO_3$ layer to fabricate a solar cell (ITO/PEIE/PDT2fBT-BT10:$PC_{71}BM$/$MoO_3$/Ag).

Example 10: Fabrication of Organic Solar Cell Including the PDT2fBT-BT20:$PC_{71}BM$ Thin Film A molybdenum oxide ($MoO_3$) layer was deposited to a thickness of 4 nm on the PDT2fBT-BT20:$PC_{71}BM$ thin film formed in Example 5 and a silver electrode was deposited to a thickness of 100 nm on the $MoO_3$ layer to fabricate a solar cell (ITO/PEIE/PDT2fBT-BT20:$PC_{71}BM$/$MoO_3$/Ag).

Example 11: Fabrication of Organic Solar Cell Including the PDT2fBT-BT30:$PC_{71}BM$ Thin Film A molybdenum oxide ($MoO_3$) layer was deposited to a thickness of 4 nm on the PDT2fBT-BT30:$PC_{71}BM$ thin film formed in Example 6 and a silver electrode was deposited to a thickness of 100 nm on the $MoO_3$ layer to fabricate a solar cell (ITO/PEIE/PDT2fBT-BT30:$PC_{71}BM$/$MoO_3$/Ag).

Example 12: Fabrication of Large-Area Organic Solar Cell Including the PDT2fBT-BT10:$PC_{71}BM$ Thin Film The procedure of Example 9 was repeated except that molybdenum oxide ($MoO_3$) and a silver electrode were deposited to thicknesses of 4 nm and 100 nm on the PDT2fBT-BT10:$PC_{71}BM$ thin film, respectively, through a large-area shadow mask instead of a small-area shadow mask. As a result, a large-area solar cell (ITO/PEIE/PDT2fBT-BT10:PC$_{71}$BM/MoO$_3$/Ag) was fabricated.

Example 13: Fabrication of Large-Area Organic Solar Cell Including the PDT2fBT-BT20:PC$_{71}$BM Thin Film The procedure of Example 10 was repeated except that molybdenum oxide (MoO$_3$) and a silver electrode were deposited to thicknesses of 4 nm and 100 nm on the PDT2fBT-BT20:PC$_{71}$BM thin film, respectively, through a large-area shadow mask instead of a small-area shadow mask. As a result, a large-area solar cell (ITO/PEIE/PDT2fBT-BT20:PC$_{71}$BM/MoO$_3$/Ag) was fabricated.

Example 14: Fabrication of Large-Area Organic Solar Cell Including the PDT2fBT-BT30:PC$_{71}$BM Thin Film The procedure of Example 11 was repeated except that molybdenum oxide (MoO$_3$) and a silver electrode were deposited to thicknesses of 4 nm and 100 nm on the PDT2fBT-BT30:PC$_{71}$BM thin film, respectively, through a large-area shadow mask instead of a small-area shadow mask. As a result, a large-area solar cell (ITO/PEIE/PDT2fBT-BT30:PC$_{71}$BM/MoO$_3$/Ag) was fabricated.

Example 15: Fabrication of Organic Solar Cell Including the PDT2fBT-BT10:IDTBR Thin Film A molybdenum oxide (MoO$_3$) layer was deposited to a thickness of 4 nm on the PDT2fBT-BT10:o-IDTBR thin film formed in Example 7 and a silver electrode was deposited to a thickness of 100 nm on the MoO$_3$ layer to fabricate a solar cell (ITO/PEIE/PDT2fBT-BT10:o-IDTBR/MoO$_3$/Ag).

Example 16: Fabrication of Organic Solar Cell Including the PDT2fBT-BT10:ITIC Thin Film A molybdenum oxide (MoO$_3$) layer was deposited to a thickness of 4 nm on the PDT2fBT-BT10:ITIC thin film formed in Example 8 and a silver electrode was deposited to a thickness of 100 nm on the MoO$_3$ layer to fabricate a solar cell (ITO/PEIE/PDT2fBT-BT10:ITIC/MoO$_3$/Ag).

Comparative Example 1: Formation of FBT-Th$_4$ Thin Film

A glass substrate was sequentially washed with isopropyl alcohol for 10 min, acetone for 10 min, and isopropyl alcohol for 10 min in an ultrasonic cleaner and dried before use. A polyethylenimine ethoxylated (PEIE) solution was spin coated on the dry glass substrate and dried at 100° C. for 10 min.

Then, the conjugated polymer PBT-Th$_4$ (Formula 5) (10 mg) synthesized in Synthesis Example 1 was dissolved in 1 mL of chlorobenzene.

The solution was spin coated on the PEIE-coated glass substrate at 600 rpm and 60° C. and heated at 80° C. for 5 min to form an FBT-Th$_4$ thin film.

Comparative Example 2: Formation of FBT-Th$_4$:PC$_{71}$BM Thin Film

An indium-tin-oxide (ITO) substrate was sequentially washed with isopropyl alcohol for 10 min, acetone for 10 min, and isopropyl alcohol for 10 min in an ultrasonic cleaner and dried before use. A polyethylenimine ethoxylated (PETE) solution was spin coated on the dry ITO substrate and dried at 100° C. for 10 min.

Then, chlorobenzene and chloronaphthalene were mixed in a 1:0.025 volume ratio to prepare a first solution. The conjugated polymer FBT-Th$_4$ (Formula 5) (10 mg) synthesized in Synthesis Example 1 and PC$_{71}$BM (15 mg) were added to 1 mL of the first solution to prepare a mixture solution. The conjugated polymer and PC$_{71}$BM were used in a weight ratio of 1:1.5.

The mixture solution was spin coated on the PETE-coated ITO substrate at 600 rpm and 60° C. and heated at 80° C. for 5 min to form an FBT-Th$_4$:PC$_{71}$BM thin film

Comparative Example 3: Formation of FBT-Th$_4$:o-IDTBR Thin Film

An FBT-Th$_4$:o-IDTBR thin film was formed in the same manner as in Comparative Example 2, except that a solution of chlorobenzene and 1,2-dichlorobenzene in a 1:1 volume ratio was used instead of the first solution, o-IDTBR (10 mg) was added instead of PC$_{71}$BM (20 mg), and the spin coating was performed at 1500 rpm instead of at 600 rpm.

Comparative Example 4: Fabrication of Organic Solar Cell Including the FBT-Th$_4$:PC$_{71}$BM Thin Film A molybdenum oxide (MoO$_3$) layer was deposited to a thickness of 4 nm on the FBT-Th$_4$:PC$_{71}$BM thin film formed in Comparative Example 2 and a silver electrode was deposited to a thickness of 100 nm on the MoO$_3$ layer to fabricate a solar cell (ITO/PEIE/FBT-Th$_4$:PC$_{71}$BM/MoO$_3$/Ag).

Comparative Example 5: Fabrication of Large-Area Organic Solar Cell Including the FBT-Th$_4$:PC$_{71}$BM Thin Film The procedure of Comparative Example 24 was repeated except that molybdenum oxide (MoO$_3$) and a silver electrode were deposited to thicknesses of 4 nm and 100 nm on the FBT-Th$_4$:PC$_{71}$BM thin film formed in Comparative Example 2, respectively, through a large-area shadow mask instead of a small-area shadow mask. As a result, a large-area solar cell (ITO/PEIE/FBT-Th$_4$:PC$_{71}$BM/MoO$_3$/Ag) was fabricated.

Comparative Example 6: Fabrication of Organic Solar Cell Using the FBT-Th$_4$:o-IDTBR Thin Film A molybdenum oxide (MoO$_3$) layer was deposited to a thickness of 4 nm on the FBT-Th$_4$:o-IDTBR thin film formed in Comparative Example 3 and a silver electrode was deposited to a thickness of 100 nm on the MoO$_3$ layer to fabricate a solar cell (ITO/PEIE/FBT-Th$_4$:o-IDTBR/MoO$_3$/Ag).

Figure 1:
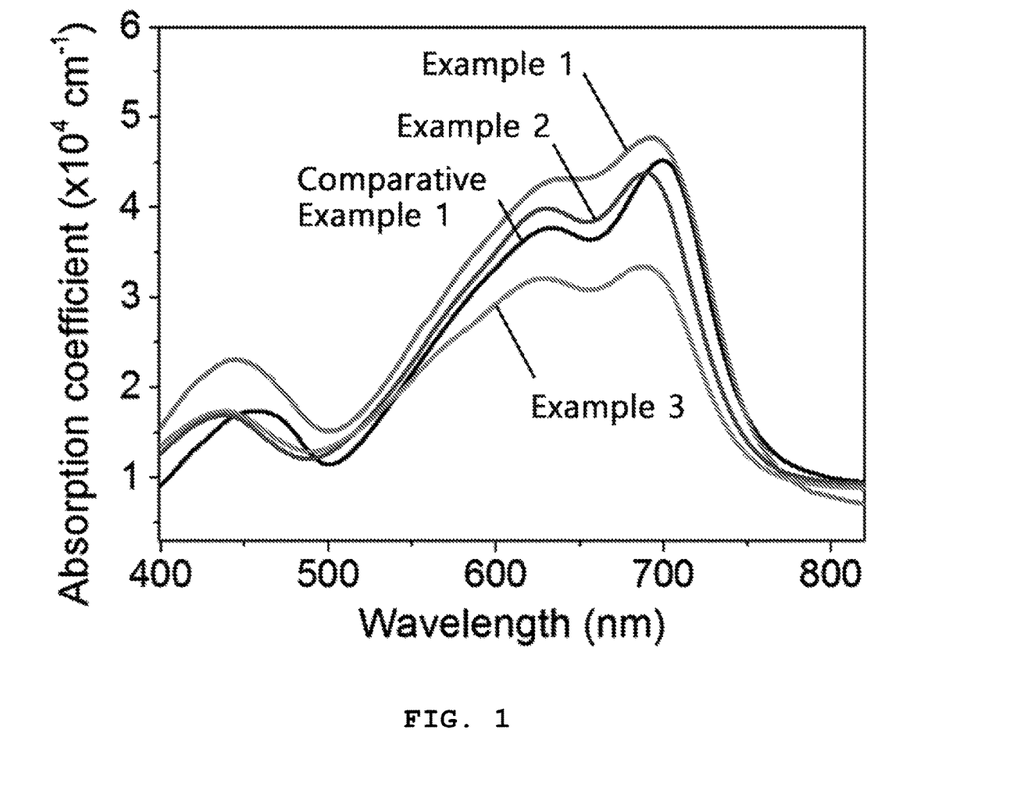
FIG. 1 shows UV-Vis absorption spectra of organic thin films formed in Examples 1 to 3 and Comparative Example 1 to compare the characteristics of the organic thin films.

Experimental Example 1: Comparison of Characteristics of the Organic Thin Films FIG. 1 shows UV-Vis absorption spectra of the organic thin films formed in Examples 1 to 3 and Comparative Example 1 to compare the characteristics of the organic thin films.

Figure 2:
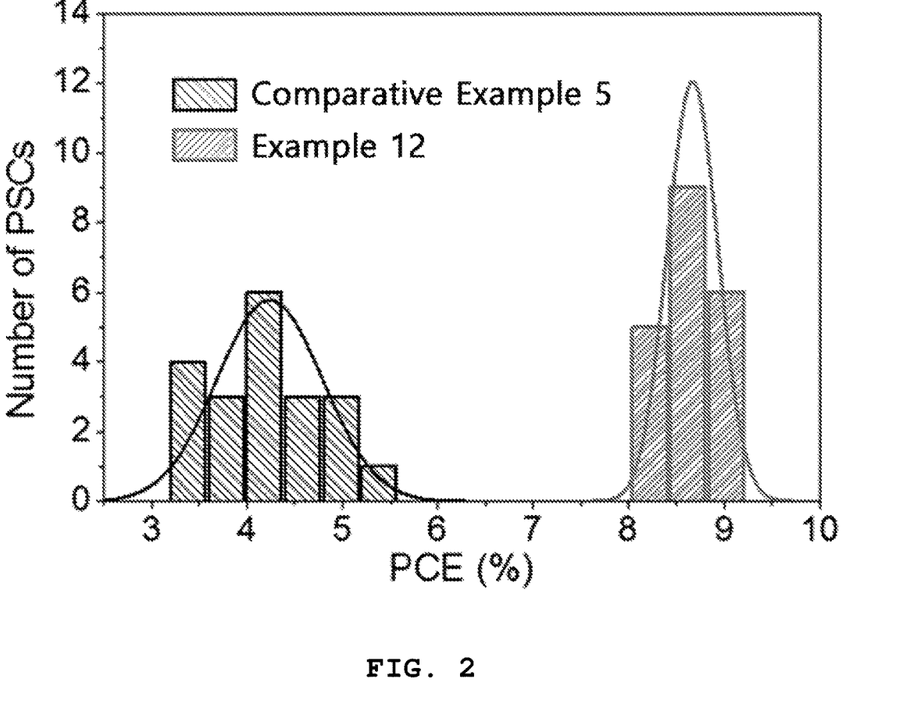
FIG. 2 shows energy conversion efficiency distributions of large-area organic solar cells fabricated in Example 12 and Comparative Example 5.

FIG. 2 shows energy conversion efficiency distributions of the large-area organic solar cells fabricated in Example 12 and Comparative Example 5.

Figure 3:
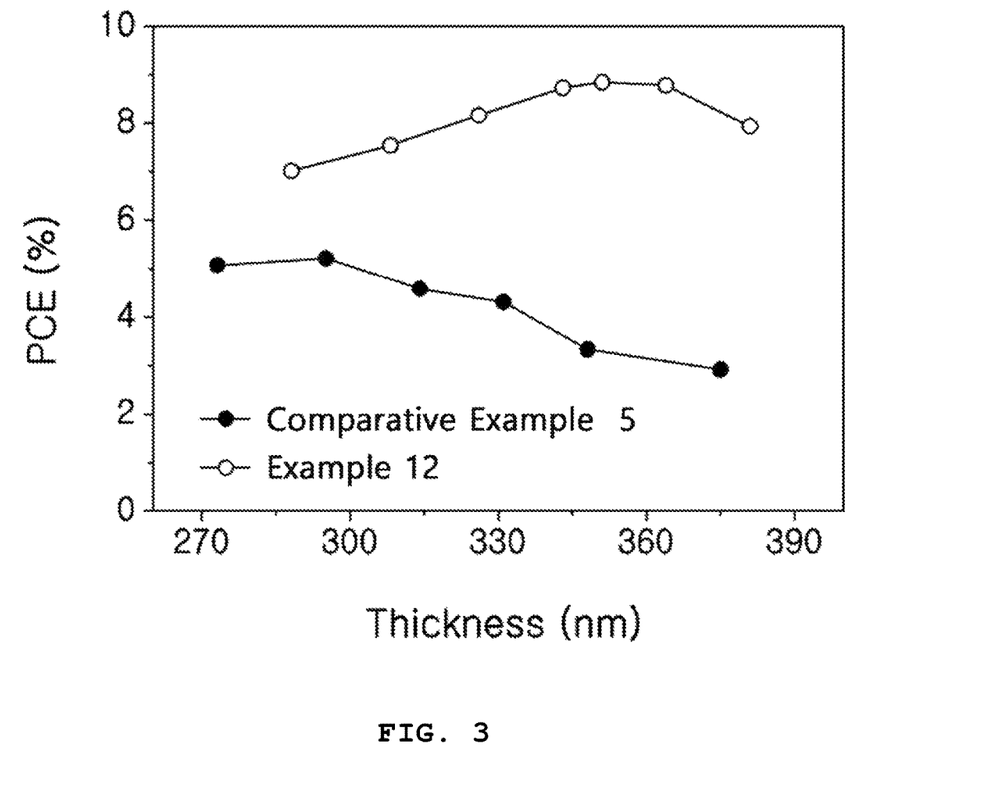
FIG. 3 shows changes in the energy conversion efficiency of large-area organic solar cells fabricated in Example 12 and Comparative Example 5 with varying thicknesses of active layers of the solar cells.

FIG. 3 shows changes in the energy conversion efficiency of the large-area organic solar cells fabricated in Example 12 and Comparative Example 5 with varying thicknesses of the active layers of the solar cells.

The organic solar cells fabricated in Examples 9-16 and Comparative Examples 4-6 were measured for current density as a function of voltage. The results are summarized in Table 1.

TABLE 1

| Example No. | Open circuit voltage ($V_{oc}$, V) | Short circuit current ($J_{sc}$, mA/cm$^2$) | Fill factor (FF, %) | Energy conversion efficiency (PCE, %) |
|---|---|---|---|---|
| Example 9 | 0.742 | 18.92 | 73.5 | 10.31 |
| Example 10 | 0.719 | 18.06 | 69.7 | 9.28 |
| Example 11 | 0.724 | 18.00 | 69.2 | 9.22 |
| Example 12 | 0.748 | 18.23 | 66.2 | 9.03 |
| Example 13 | 0.723 | 17.24 | 64.8 | 7.80 |
| Example 14 | 0.728 | 16.01 | 62.2 | 7.35 |
| Example 15 | 0.953 | 16.79 | 68.0 | 8.95 |
| Example 16 | 0.874 | 16.59 | 65.6 | 8.24 |
| Comparative Example 4 | 0.753 | 15.48 | 61.5 | 7.12 |
| Comparative Example 5 | 0.762 | 12.80 | 60.0 | 5.25 |
| Comparative Example 6 | 1.074 | 10.41 | 55.7 | 4.93 |

As shown in Table 1, the performance characteristics of the organic solar cells fabricated using the fullerene derivative PC$_{71}$BM in Examples 9-11 and Comparative Example 4 were compared. As a result, the organic solar cell of Example 9 had a short circuit current and a fill factor (FF) of 18.92 mA/cm$^2$ and 73.5%, respectively. The organic solar cell of Example 10 was found to have a short circuit current and a fill factor (FF) of 18.06 mA/cm$^2$ and 69.7%, respectively. The organic solar cell of Example 11 was found to have a short circuit current and a fill factor (FF) of 18.00 mA/cm$^2$ and 69.2%, respectively. The organic solar cell of Comparative Example 4 was found to have a short circuit current and a fill factor (FF) of 15.48 mA/cm$^2$ and 61.5%, respectively, which were much lower than those of the organic solar cells of Examples 9-11.

The energy conversion efficiencies of the organic solar cells of Examples 9-11 were found to be much higher by ~1-3% than that of the organic solar cell of Comparative Example 4.

The entire performance characteristics of the large-area organic solar cells of Examples 12-14 and Comparative Example 5 were considerably deteriorated.

However, the organic solar cell of Example 12, which was fabricated using PDT2fBT-BT10 by a large-area process, was reduced by only ~1% in energy conversion efficiency, by only 1 mA/cm$^2$ in short circuit current, and by only 7% in fill factor. That is, the organic solar cell of Example 12 underwent relatively small reductions in energy conversion efficiency, short circuit current, and fill factor. In contrast, the performance characteristics of the large-area organic solar cells fabricated using PDT2fBT-BT20 (Example 13) and PDT2fBT-BT30 (Example 14) were reduced by a factor of at least 2 compared to those of the organic solar cell of Example 12.

The energy conversion efficiency and short circuit current of the organic solar cell of Comparative Example 5 were significantly decreased by ~2% and ~3 mA/cm$^2$, respectively. These results showed that although the organic solar cell fabricated using FBT-Th$_4$, which is the most widely used conjugated polymer, on a laboratory scale had a high efficiency but the efficiency and performance of the organic solar cell fabricated over a large area were below the averages. In conclusion, the effectiveness of FBT-Th$_4$ is very low when applied to a practical process.

In contrast, the use of the novel inventive conjugated polymers ensured very high efficiencies of ≥10% when applied to processes on a laboratory scale. In addition, the use of the novel inventive conjugated polymers achieved efficiencies of a maximum of 9% with high reproducibility when applied over a large area. These results reveal that the use of the novel inventive conjugated polymers can provide a solution to the problems encountered in the use of conventional conjugated polymers for the fabrication of organic solar cells on a large scale.

Changes in the performance characteristics of the organic solar cells using the fullerene derivative PC$_{71}$BM and the organic solar cells using o-IDTBR and ITIC as non-fullerene electron acceptors were compared. As a result, the performance characteristics of the organic solar cells using the novel inventive conjugated polymers and the fullerene electron acceptor were slightly deteriorated but their efficiencies were still maintained at ≥8%.

The efficiency of the organic solar cell of Comparative Example 6 was very low (4.93%), demonstrating that a high efficiency can be achieved only when the conventional conjugated polymer is combined with a specific electron acceptor. In contrast, the novel inventive conjugated polymers were less affected by electron acceptors. Therefore, the inventive conjugated polymers can be applied to a wide range of organic solar cells compared to the conventional conjugated polymers.

To sum up, the structures of the inventive conjugated polymers were precisely controlled by reducing the content of thiophene moieties having side chains and limiting the regularity of the units for optimal orientation such that high solubilities were achieved and uniform photoactive layers were formed over a large area. Thus, the inventive conjugated polymers were free from the problem of low solubility of the conjugated polymer used in Comparative Example 4 caused by its high orientation and overcame the disadvantage of low uniformity of the photoactive layer formed over a large area.

In other words, the inventive conjugated polymers were synthesized by randomly arranging the units containing no alkyl thiophene moieties and varying the proportion of the units and the degrees of aggregation of the inventive conjugated polymers in a solution were compared. As a result, the aggregation of the conjugated polymer PDT2fBT-BT10 in a solution was the most limited among the conjugated polymers synthesized in Synthesis Examples 2-4. When photoactive layers of the same thickness were formed using the conjugated polymers synthesized in Synthesis Examples 2-4, a higher current density was obtained in the photoactive layer formed using the conjugated polymer PDT2fBT-BT10 than in the other photoactive layers.

The small-area organic solar cells fabricated using mixtures of the inventive conjugated polymers and PC$_{71}$BM showed improved photoelectric conversion efficiencies compared to the small-area organic solar cells fabricated using the conventional conjugated polymer FBT-Th$_4$. In addition, the large-area (1.0 cm$^2$) devices fabricated using the inventive conjugated polymers maintained relatively high efficiencies, indicating their improved life characteristics.

Furthermore, the high-efficiency organic solar cells were fabricated in a highly reproducible manner. The inventive conjugated polymers were used to form very uniform photoactive layers even when applied to a large-area process. The inventive conjugated polymers maintained their high efficiencies even at large thicknesses of the photoactive layers (FIGS. 1-3).

Particularly, the efficiencies of the organic solar cells fabricated using the conventional conjugated polymers were reduced to ≤4% with increasing thickness of the photoactive layers. In contrast, the organic solar cells fabricated using the inventive conjugated polymers did not lose their efficiency despite the increasing thickness of the photoactive layers.

The efficiencies of the organic solar cells fabricated using the inventive conjugated polymers were more reproducible than those of the organic solar cells fabricated using the conventional conjugated polymer.

Generally, the performance characteristics (including short circuit current, fill factor, and light conversion efficiency) of an organic solar cell using a conjugated polymer and o-IDTBR or ITIC as a non-fullerene electron acceptor are considerably reduced, like those of an organic solar cell using FBT-Th$_4$. However, the organic solar cells using the inventive novel conjugated polymer PDTfBT-BT10 (Formula Ia) were better driven with higher efficiency than the organic solar cell using the conventional conjugated polymer FBT-Th$_4$ and o-IDTBR.

What is claimed is:

1. A conjugated polymer for an organic solar cell, represented by Formula I:

wherein R$_1$, R$_2$, R$_3$, and R$_4$ are the same or different and are each independently hydrogen (H), fluorine (F), a substituted or unsubstituted C$_1$-C$_{30}$ straight or branched alkyl group or a substituted or unsubstituted C$_3$-C$_{30}$ cycloalkyl group and n is a real number from 0.1 to 0.3.

2. The conjugated polymer according to claim 1, wherein, in Formula I, R$_1$ and R$_2$ are identical to or different from each other and are each independently a C$_{16}$-C$_{28}$ branched alkyl group, and R$_3$ and R$_4$ are identical to or different from each other and are each independently H or F.

3. The conjugated polymer according to claim 2, wherein R$_1$ and R$_2$ in Formula I are symmetric to each other, have the same structure, and are C$_{20}$-C$_{24}$ branched alkyl groups.

4. The conjugated polymer according to claim 3, wherein both R$_3$ and R$_4$ I are H.

5. The conjugated polymer according to claim 3, wherein n is 0.1.

6. The conjugated polymer according to claim 1, wherein the conjugated polymer represented by Formula I is selected from the group consisting of those represented by the following formulae Ia, Ib, and Ic: